US009836048B1

(12) United States Patent
Widmaier

(10) Patent No.: US 9,836,048 B1
(45) Date of Patent: Dec. 5, 2017

(54) WIRELESS VOICE ACTIVATED CONTROL SYSTEM FOR BOW MOUNTED ELECTRIC TROLLING MOTOR

(71) Applicant: James C. Widmaier, Huntington, PA (US)

(72) Inventor: James C. Widmaier, Huntington, PA (US)

( * ) Notice: Subject to any disclaimer, the term of this patent is extended or adjusted under 35 U.S.C. 154(b) by 28 days.

(21) Appl. No.: 15/074,344

(22) Filed: Mar. 18, 2016

Related U.S. Application Data

(60) Provisional application No. 62/135,889, filed on Mar. 20, 2015.

(51) Int. Cl.
| | | |
|---|---|---|
| *B63H 20/02* | (2006.01) | |
| *G10L 15/22* | (2006.01) | |
| *G05D 1/00* | (2006.01) | |
| *B63H 20/00* | (2006.01) | |
| *B63H 20/12* | (2006.01) | |

(52) U.S. Cl.
CPC ......... *G05D 1/0022* (2013.01); *B63H 20/007* (2013.01); *B63H 20/02* (2013.01); *B63H 20/12* (2013.01); *G10L 15/22* (2013.01); *G10L 2015/223* (2013.01)

(58) Field of Classification Search
CPC ...... G05D 1/0022; B63H 20/02; B63H 20/12; B63H 20/007; G10L 15/22
USPC .............................................. 701/2; 318/588
See application file for complete search history.

(56) References Cited

U.S. PATENT DOCUMENTS

| | | | | |
|---|---|---|---|---|
| 4,966,566 A | * | 10/1990 | Baird .................... | B63H 20/007 248/642 |
| 5,832,440 A | * | 11/1998 | Woodbridge ........... | G10L 15/26 114/144 A |
| 6,280,267 B1 | * | 8/2001 | Griffith, Sr. ............ | B63H 20/10 440/53 |
| 6,431,923 B1 | * | 8/2002 | Knight .................. | B63H 20/007 440/6 |
| 6,447,348 B1 | * | 9/2002 | Gilley .................. | B63H 20/007 440/6 |
| 6,863,581 B2 | | 3/2005 | Anderson | |
| 7,381,108 B1 | | 6/2008 | Salmon | |

(Continued)

*Primary Examiner* — Tan Q Nguyen
(74) *Attorney, Agent, or Firm* — Rosenberg, Klein & Lee

(57) ABSTRACT

A wireless voice controlled system for a trolling motor assembly which enables fully automatic usage of the trolling motor assembly in different modes of operation, including automatic voice controlled storage/locking of the trolling motor assembly at the boat base, launching the trolling motor assembly from a horizontal/storage position to a vertical position for operation in water, locking the trolling motor assembly in the vertical position, and retrieving the trolling motor back to a horizontal/storage/lock position on the bow mounted base using voice commands entered by a boat operator in a microphone on a wireless command transmitter. The system enables the boat operator to control the steering of the trolling motor and speed of the propeller for the boat propulsion using voice commands transmitted wirelessly from the handheld (or stationary) wireless command transmitter to a receiver embedded in a positioning and operation control unit having a logic and mechanical drive mechanism for transitioning the trolling motor assembly into any desired mode of operation and controlling the operation of the motor.

18 Claims, 16 Drawing Sheets

(56) References Cited

U.S. PATENT DOCUMENTS

2004/0227484 A1* 11/2004 DePasqua .............. B63H 25/02
                                                              318/588
2007/0232159 A1* 10/2007 Lee ...................... B63H 20/007
                                                               440/53

* cited by examiner

WIRELESS VOICE ACTIVATED CONTROL SYSTEM FOR BOW MOUNTED ELECTRIC TROLLING MOTOR

REFERENCE TO THE RELATED APPLICATIONS

This Utility Patent Application is based on a Provisional Patent Application No. 62/135,889 filed on 20 Mar. 2015.

FIELD OF THE INVENTION

The present invention is directed to electric trolling motors, and particularly, to a system for fully automated operation and usage of a vessel mounted electric trolling motor enhanced by a wireless voice activated control functionality.

The present invention is further directed to a voice activated and wirelessly controlled vessel mounted electric trolling motor system enabling fully automated storage and locking of the trolling motor on a base of a boat, launching the trolling motor from a horizontal position to a vertical position for operation, locking the trolling motor assembly in the vertical position, and retrieving the trolling motor back to a horizontal position.

The present invention, in its unique overall concept, is directed to a trolling motor system equipped with a voice activated wireless control system for remotely controlling the trolling motor modes of operation, steering, and speed of the propeller for propulsion of the boat by using a handheld wireless command transmitter equipped with a microphone for entering voice commands by a user and supported by a command logic configured to convert the voice ("word") commands into corresponding command (frequency) signals which are wirelessly transmitted to a position and operation control unit configured to automatically actuate a mode of operation and operational parameters of the trolling motor vocally requested by the user.

BACKGROUND OF THE INVENTION

Two major manufacturers of bow mountable fishing motors are Minn Kota and Motor Guide. The functional operations of storing/locking, launching, operating, and retrieving the trolling motor are usually accomplished in their systems manually with a rope or system of levers.

Recently, MotorGuide has developed bow mounted trolling motors with controlled positioning of a motor for storing/locking, launching, operating, or retrieving, and controlled operation of the motor for propulsion. The system (MotorGuide X3 Fast Cable Bow Mount Trolling Motor) has a cable connecting a foot control unit to the positioning mechanism, as well as to the motor steering and propulsion unit. The control of the trolling motor is attained through actuating a foot pedal to control a dual-cable pull-pull steering system to affect the motor operation. Thus, the control system in the Motorguide X3 Fast Control Bow Mounting Trolling Motor is not wireless.

An additional shortcoming of the prior art system is that in order to turn the system ON/OFF, a boat operator must walk to the bow of the boat to press the corresponding button.

Because the current designs of commercial trolling motors require manual positioning at the bow of the boat, safety and convenience become critical issues during extreme sea states and insufficient daylight conditions. With the existing trolling motor systems, users, especially elderly and handicapped people are thus placed in dangerous situations due to the requirement of manual positioning and operation of the bow mounted electric trolling motors.

Thus, there is a critical need in the trolling motors industry to eliminate the need of a person shifting or otherwise maneuvering on the boat to operate the trolling motor located at one end of the boat, as well as to replace manual operation with fully automated wireless remotely controlled positioning and operation of the trolling motor.

SUMMARY OF THE INVENTION

It is therefore an object of the present invention to provide a wireless remote control system for fully automatic operation and configuration of a boat's mounted electric trolling motor in different operational modes.

It is another object of the present invention to provide a voice controlled system for a deck mounted trolling motor providing an efficient automatic remotely controlled operation and transitioning between various configurations and modes of operation, such as (1) positioning of the trolling motor assembly into the store/lock configuration, (2) launching the transitioning of the trolling motor's propeller assembly from the horizontal store/lock position to the vertical position for operation in the water, (3) for locking the trolling motor assembly in the vertical position before propulsion is activated, and (4) to retrieve the trolling motor assembly from its vertical propulsion (operation) position to the safe store/lock horizontal position on the base of the boat.

It is another object of the present invention to provide a wireless voice activated control system for an electric trolling motor which includes a handheld (or stationary) wireless voice activated command transmitter for wireless transmission of command signals to a positioning and operation control unit receiving the command signals, and controlling the positioning and operation of the trolling motor assembly mounted on the boat for storage, locking, launching, retrieval and operation (propulsion).

In one aspect, the present invention is directed to a wireless voice controlled system for a trolling motor assembly installed on the deck of a boat and a wireless handheld (or stationary) command transmitter unit equipped with a microphone to enter voice commands by a user of a boat to automatically control the configuration (positioning) and operation of the trolling motor assembly.

Preferably, the transmitter command unit has embedded therein a logic configured to translate the entered voice commands into corresponding command signals which are transmitted wirelessly from the transmitter command unit.

The subject system further includes a base unit attached to the deck of the boat, and a positioning and operation control unit pivotally attached to the base unit. The positioning and operation control unit includes a receiver equipped with antenna adapted to wirelessly receive the command signals from the transmitter command unit, and a drive mechanism operatively coupled to the receiver and configured logically and electromechanically to automatically operate the trolling motor in correspondence with the command signals received at the receiver.

The voice commands are represented by a number of predetermined command words which the operator (user) says (enters) in the microphone of the transmitter command unit to operate the trolling motor assembly in a desired mode of operation, to transition the trolling motor assembly between the positioning (configurations) corresponding to the modes of operation, and to control the operational parameters of the trolling motor in its active (operational) state.

The trolling motor assembly includes a shaft and a propeller actuatable by the trolling motor attached at one end of the shaft. The shaft is attached to the positioning and operation control unit.

The wireless command transmitter unit is voice controlled by the user and is configured for generating and wirelessly transmitting to the positioning and operation control unit respective position (configuration) command signals for controllably positioning (configuring) the trolling motor assembly in a position desired by the user and to operate the trolling motor in a preferred regime.

The position (configuration) of the trolling motor assembly may be selected from an operational (active) position, a non-operational (idle) position, and at least one intermediate position.

In the operational (active) position, the shaft of the trolling motor assembly is disposed substantially vertically with respect to the base unit with the propeller (as well as the trolling motor itself) immersed in water. In the non-operational (idle) position, the shaft of the trolling motor assembly is disposed and locked substantially horizontally with respect to the base unit with the propeller and the trolling motor removed from water. In one of the intermediate positions, the shaft may be disposed vertically with respect to the base unit with the propeller all the trolling motor removed from water.

The operation voice commands and corresponding command signals also control the steering of the trolling motor and/or speed of the propeller for the boat propulsion.

The positioning and operation control unit includes a locking mechanism supported by the drive unit's logic and electromechanical components for locking the trolling motor assembly to the base unit in each of the operational, non-operational and intermediate positions.

Upon the entrance of the "store" word command, the wireless command transmitter unit generates and transmits the "locking" command signal. Upon the entrance of the "launch" word command, the wireless command transmitter unit generates and transmits the "launching" command signal. Upon the entrance of the "Operate" word command, the wireless command transmitter unit generates and transmits to the receiver the "operating" command signal. Upon the "retrieve" word command is voiced by the user, the wireless command transmitter unit generates and transmits the "retrieve" command signal to the receiver.

When the trolling motor assembly is to be brought (through actuation of the command signal corresponding to the voice command entered by the user) to its non-operational horizontal position, the wireless command transmitter unit generates and transmits an "actuation" command signal to the positioning and operation control unit to power ON the positioning and operation control unit.

Subsequent to the "actuation" command signal, the wireless command transmitter unit generates and transmits a "locking" command signal to the locking mechanism in the positioning and operation control unit, resulting in actuation of the locking mechanism for locking the trolling motor assembly to the base unit in the non-operational horizontal position.

Subsequent to the "LAUNCH" voice command of the user, the wireless command transmitter unit generates and transmits a "launching" command signal to the positioning and operation control unit, resulting in de-actuation of the locking mechanism and in releasing the trolling motor assembly from locking at the base unit in the non-operational horizontal position. The "launching" command signal further actuates a pivotal displacement of the trolling motor assembly from the non-operational substantially horizontal position to the operational substantially vertical position.

Furthermore, subsequent to the voice command "Operate" of the user, the wireless command transmitter unit generates and wirelessly transmits to the positioning and operation control unit an "operation" command signal, resulting in actuation of the locking mechanism, and subsequent locking of the trolling motor assembly to the base unit in the operational vertical position.

In addition, subsequent to the voice command "Retrieve" of the user, the wireless control transmitter generates and wirelessly transmits a "retrieve" command signal to the positioning and operation control unit resulting in de-actuation of the locking mechanism to release the trolling motor assembly from a locked state at the base unit in the vertical position, followed by the vertical retraction of the shaft of the trolling motor assembly and removal of the trolling (also referred to herein as propulsion) motor and propeller from water. Subsequently, the trolling motor assembly is pivotally displaced from the non-operational vertical position to the non-operational horizontal position.

The handheld (or stationary) wireless command transmitter unit includes an Audio-to-Digital Converter operatively coupled to the microphone to translate the voice (word) command entered by the user into a corresponding digital representation of the word command. The command transmitter unit further includes a CPU chip configured with Digital Spectrum Analysis logic for analyzing the digital representation of the entered voice command, and a word-to-frequency ($f_0, \ldots, f_n$) assignment logic.

A number of word commands are predetermined for a user for the word-to-frequency assignment logic unit which uses a Look-Up-Table (LUT) pre-stored in the command transmitter unit to assign a corresponding command signal (for example, corresponding signal frequency) to the digital representation of the entered voice command (word).

A command unit is coupled to the output of the word-to-frequency assignment logic unit. The assigned command signal enters the command unit which generates the command signal in correspondence to the assigned command frequency, and wirelessly transmits the command signal to the receiver in the positioning and operation control unit. The wireless command transmitter unit includes a transmitting antenna to transmit the command signals to the receiving antenna in the positioning and operation control unit.

The receiver unit is configured to process the command signals received from the wireless command transmitter unit. A drive mechanism embedded in the positioning and operation control unit is actuated responsive to the command signals received and processed at the receiver and is configured to control the positioning and operational parameters of the trolling motor assembly, as well as to actuate/de-actuate the locking mechanism in accordance with the command signals to transition the trolling motor assembly between the configurations (positioning), and to operate the trolling motor in the desired configuration (mode of operation).

The locking mechanism in the positioning and operation control unit includes a locking solenoid operatively coupled to the receiver unit, and a solenoid pin coupled to the locking solenoid and configured for displacement between an extended position and a retracted position. Upon receipt of the "locking" command signal at the receiver, the drive mechanism actuates the locking solenoid to displace the solenoid pin in the extended position, thus engaging the solenoid pin in a corresponding opening formed in the base unit. Upon receipt of the "launching" command signal at the receiver, the drive mechanism actuates the locking solenoid to displace the solenoid pin into the retracted position.

The locking mechanism in the positioning and operation control unit further includes an operation lock solenoid operatively coupled to the receiver unit and an operation lock pin coupled to the operation lock solenoid and configured for displacement between an extended position and a retracted position thereof.

The drive mechanism in the positioning and operation control unit further includes an elastic (for example, rubber) roller operatively coupled to the shaft of the trolling motor assembly, a DC motor coupled to a pivot shaft of the positioning and operation control unit, an engage solenoid unit operatively coupled to the elastic roller, and an operation lock solenoid.

Upon receipt of the "launching" command signal at the receiver, the drive mechanism actuates the engage solenoid to bring the rubber roller in gripping engagement with the shaft of the trolling motor assembly, and actuates the operation lock solenoid to displace the operation lock pin in the retracted position. The drive mechanism also actuates the DC motor to rotate the housing of the positioning control and operation unit about the pivot shaft, thereby rotating the shaft of the trolling motor assembly towards its operational vertical position.

In another aspect, the present invention is directed to a method for operating the deck mounted trolling motors which starts with predetermining a plurality of voice commands (word commands) for a user to be entered into a microphone of a wireless command transmitter unit for controlling positioning (configuration) and modes of operation of the trolling motor assembly. The word commands may include, for example, "ON", "STORE", "LAUNCH", "OPERATE", "RETRIEVE", "SLOW", "MEDIUM", "FAST", "STARBOARD", "PORT", "STOP", "OFF" commands, and others.

The method continues by entering the "STORE" voice command in the microphone of the command transmitter unit for storage/locking of the trolling motor assembly in a horizontal position on the deck (for example, the bow) of a boat.

The method further comprises the steps of installing a positioning and operation control unit (also referred to herein as a control unit) at the deck of a boat, and equipping the positioning and operation control unit with a command receiver and a drive mechanism for positioning (configuring) the trolling motor assembly in one of several modes of operation (configurations), including: store/lock, launch, operate, and retrieve modes of operation (configurations). The positioning and operation control unit also includes a locking mechanism actuated by the drive mechanism for locking the trolling motor assembly at its position when needed.

The subject method further continues by entering a voice command into a microphone of the handheld (or stationary) command transmitter unit to actuate generation of a corresponding command (frequency) signal wirelessly transmitted to the receiver embedded in the positioning and operation control unit to actuate a corresponding action of the drive mechanism.

Subsequent to entering a LAUNCH voice command into the microphone, the wireless command transmitter unit generates and wirelessly transmits to the positioning and operation control unit a "launching" command signal, resulting in de-actuation (by the drive mechanism) of the locking mechanism and releasing the trolling motor assembly from a locked condition at the base unit in the non-operational horizontal position.

In this mode of operation, the "launching" command signal actuates pivotal displacement of the trolling motor assembly from the non-operational horizontal position to the operational vertical position.

Furthermore, subsequent to entering a LOCK voice command into the microphone by the user, the wireless command transmitter unit generates and transmits to the positioning and operation control unit a "locking" command signal, resulting in actuation of the locking mechanism by the drive mechanism, and in locking of the trolling motor assembly to the base unit in the operational vertical position.

Subsequent to entering a RETRIEVE voice command in the microphone by the user, the wireless command transmitter generates and transmits to the positioning and operation control unit a "retrieving" command signal, resulting in the vertical retraction of the shaft of the trolling motor assembly and removal of the propeller from water, followed by de-actuation of the locking mechanism to release the trolling motor assembly from being locked to the base unit in the vertical position, and the subsequent pivotal displacement of the trolling motor assembly from the non-operational vertical position to the non-operational horizontal position.

Upon receipt of the OPERATE" command signal, the positioning and operation control unit activates the logic of the drive mechanism to position and lock the trolling motor assembly to the base for operating the electric trolling motor assembly for propelling the boat.

This and other objects of the present invention will become apparent when considered in view of further description accompanying the Patent Drawings.

BRIEF DESCRIPTION OF THE DRAWINGS

FIG. 3 illustrates the trolling motor assembly stored/locked horizontally at the bow of the boat, FIG. 4 illustrates the trolling motor assembly in the launching mode of operation (i.e., transitioning from the horizontal store/lock position to the vertical position), FIG. 5 illustrates the trolling motor assembly locked in the vertical operational (active) position, and FIG. 6 illustrates the trolling motor assembly in the vertical retrieved position;

DETAILED DESCRIPTION OF THE PREFERRED EMBODIMENT(S)

Figure 1:
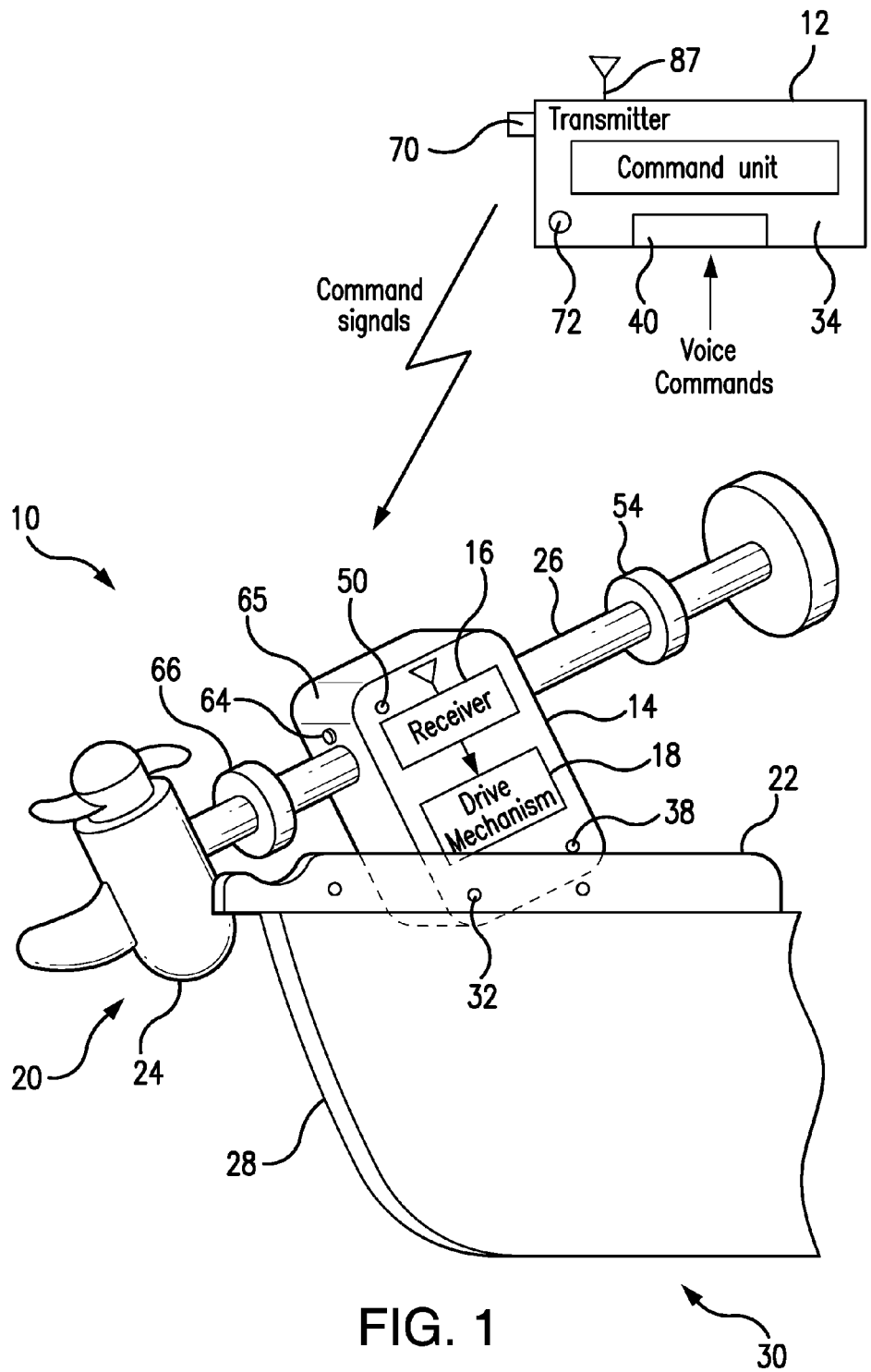
FIG. 1 is a perspective view of the subject system depicting the positioning and operation control unit attached to the shaft of a trolling motor assembly and the base unit mounted to the deck of a boat.

The present invention solves the issues of safety and convenience for users of deck mounted electric trolling motors by providing fully automated voice actuated wireless remote control of positioning and operation of trolling motors from any area on the boat.

A user (or operator) of a boat is provided with a handheld (or stationary) wireless command transmitter unit to enable the user to wirelessly transmit one or a number of predetermined voice ("word") commands to a positioning and operation unit attached to the shaft of the trolling motor assembly.

The voice commands may include, but not limited to, the predetermined words, such as, for example, "ON" (to turn ON the power for the positioning and operation control unit and the wireless command transmitter command unit), "STORE", "LAUNCH", "OPERATE", "RETRIEVE", "PORT", "STARBOARD", "SLOW", "MEDIUM", "FAST", "STOP", "OFF", and any other voice commands (words) which may benefit the fully automated trolling motor operation.

A base mounted at the bow of the vessel (boat) acts as a pivot point for all positioning (configuration) modes of the trolling motor assembly. The positioning and operation control unit attached around the shaft of the trolling motor is also pivotally attached to the base unit on the deck (for example, the bow) of the boat. The positioning and operation control unit is equipped with a receiving unit to wirelessly receive and process command signals from the handheld (or stationary) wireless command transmitter, and also can be turned ON or OFF.

With a drive mechanism using an internal (auxiliary) drive motor coupled to rubber rollers and solenoids, the positioning and operation control unit is capable of automatic storing/locking the trolling motor to the base in the horizontal position or in the vertical position, or of automatic transitioning (launching) the trolling motor to a vertical position, or of operating the trolling motor (which amounts to locking the motor in a vertical position where the propeller is immersed in the water and operates to propel the vessel), or retrieve the trolling motor assembly from the vertical to the horizontal position. The sequence of control commands is defined by the subject system's embedded logic.

The following detailed description encompasses a mode or modes of operation of the subject wireless voice activated system for controlling the deck mounted electric trolling motor assembly. This description is not intended to be limited to the embodiment of the subject system described herein for exemplary illustration purposes, but to allow one skilled in the art to understand the advantages and specifics of the subject inventive concept, design and functionality.

The present wireless voice controlled positioning and operating system 10 for a deck mounted (for example, bow mounted) electric trolling motor assembly 20 includes a handheld (or a stationary) wireless command transmitter 12 for activating a fully automatic control of the trolling motor, a positioning and operation control unit 14 housing a command receiver 16 and a drive mechanism 18 for positioning the trolling motor assembly 20 in one of several configurations (also referred to herein intermittently as positions, and modes of operation), including store/lock, launch, operate, and retrieve.

The positioning and operation control unit 14 is also equipped with means to steer the boat to port or starboard, or regulate the speed of the propulsion motor for the propeller rotation and propulsion under control of the voice-based commands received wirelessly from the remote command transmitter unit 12.

The system 10 further includes a base unit 22 installed on the deck (for example, the bow) 28 of the boat 30, and designed for locking the trolling motor assembly 20 in a horizontal or vertical position with respect to the boat. The base unit 22 also is designed to act as a pivot position to launch/retrieve the trolling motor assembly to/from the horizontal and/or vertical positions.

Figure 5:
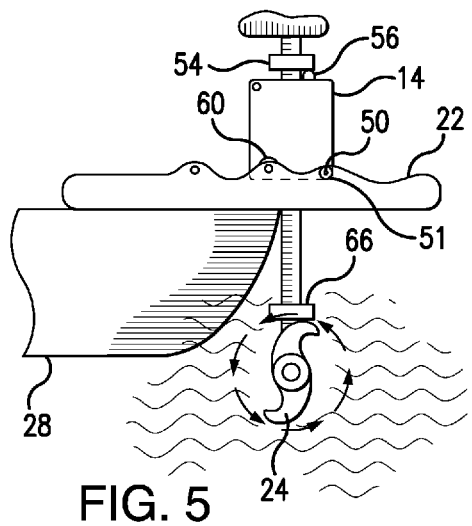

As shown in FIG. 1, the deck mounted electric trolling motor assembly 20 (shown as being mounted on the bow 28 for illustrative purposes) includes a propeller assembly 24 attached at one end of a shaft 26. The propeller assembly 24 includes the propeller with several blades and the trolling motor 92 (shown in FIGS. 15 and 16B) sealed inside a watertight compartment at the end of the shaft 26. It is submerged during operation, as shown in FIG. 5. The shaft 26 is affixed to the positioning and operation control unit 14 which is installed at the deck of the boat, for example, the bow 28 of the boat 30 with a pivot point 32 on the base 22.

Figure 2A:
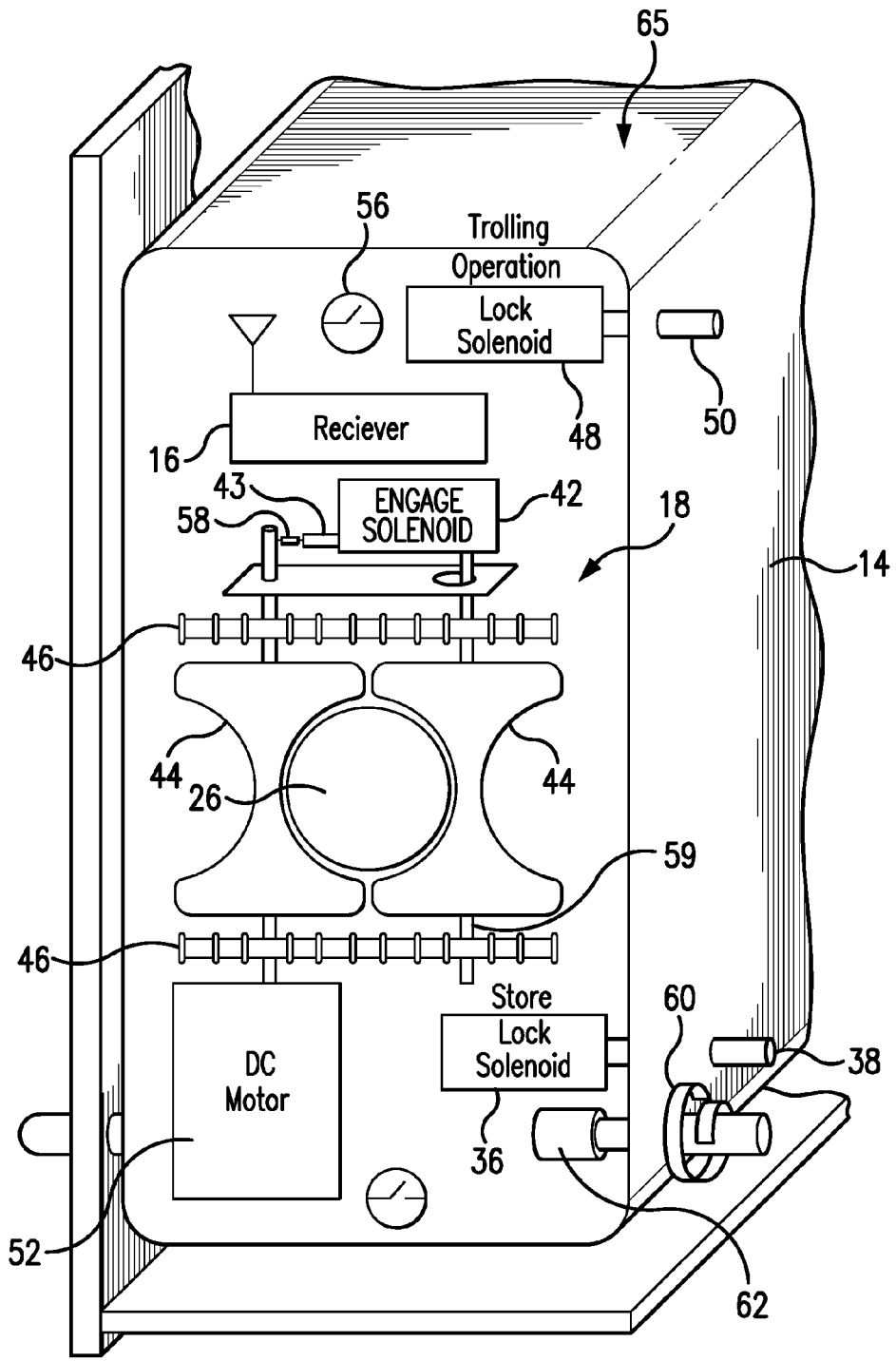
FIG. 2A is a schematic illustration of the electro-mechanical components of the drive mechanism in the subject positioning and operation control unit.

As shown in FIGS. 1 and 2A, the positioning and operation control unit 14 includes the wireless receiver 16 which is designed with the capability of receiving and processing numerous command signals (also referred to herein as frequency command signals), $f_0, f_1, f_2, f_3, f_4, \ldots, f_n$ received from the wireless command transmitter unit 12.

A drive mechanism 18 is operatively coupled to the receiver 16 to automatically execute a respective action desired by the user, including powering ON/OFF of all units in the subject system, enable the trolling motor assembly to be automatically transitioned in "store/lock" position, "launch" configuration, "operation" mode of operation, as well as "retrieve" position, and control steering mode of operation and speed of the propulsion.

Figure 8:
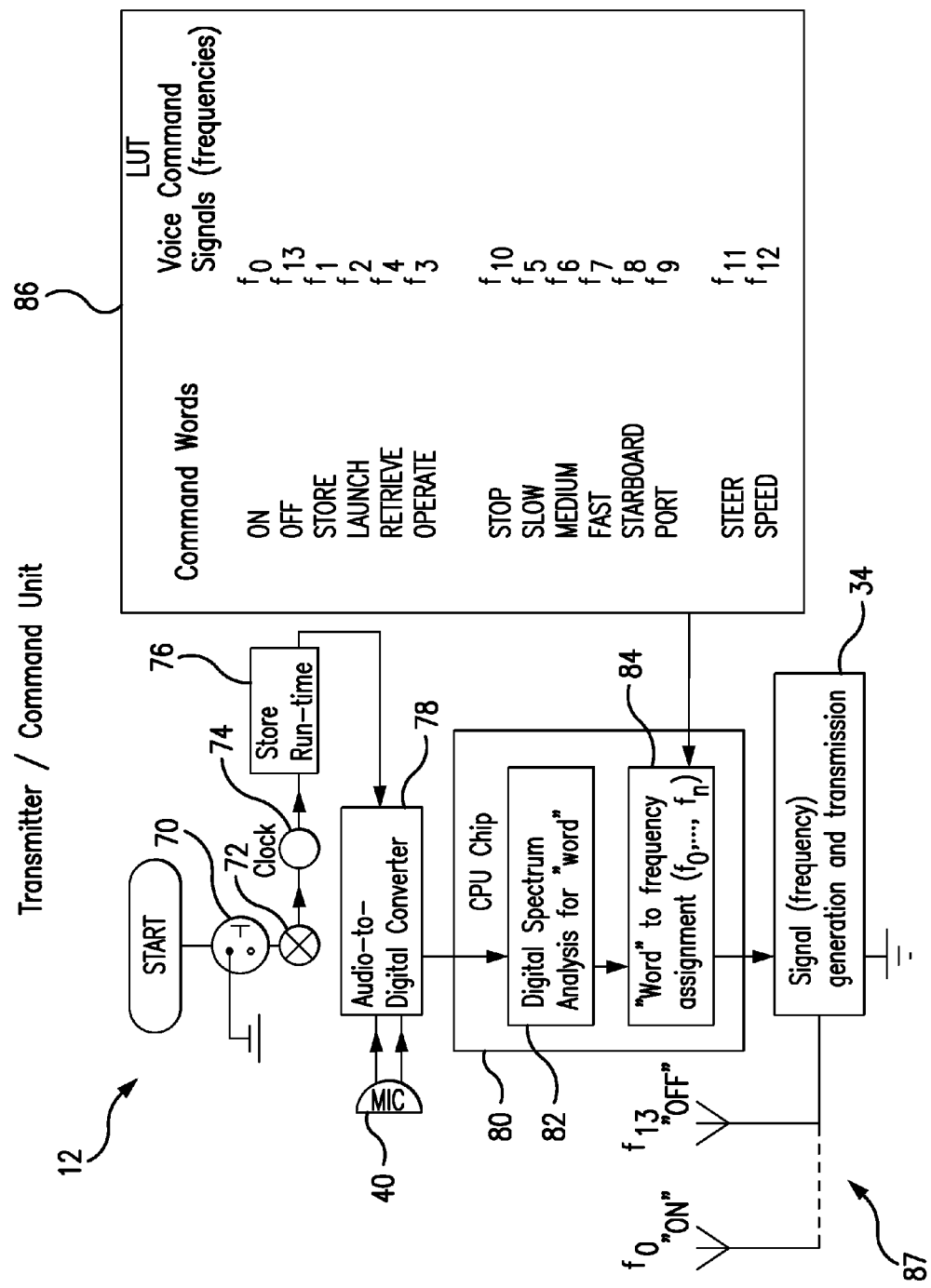
FIG. 8 is a schematic diagram representative of the electronic scheme/logic embedded in the subject wireless command transmitter unit and supporting voice controlled positioning and operation of the trolling motor assembly.

Each command signal received at the receiver 16 corresponds to a voice command (audio input) entered by the user into a microphone of the command transmitter 12. A schematic representation of the frequency command signal generation from the voice (word) commands entered by the user and the wireless transmission from the command transmitting unit 12 is depicted in FIG. 8, and will be detailed in further paragraphs.

Figure 3:
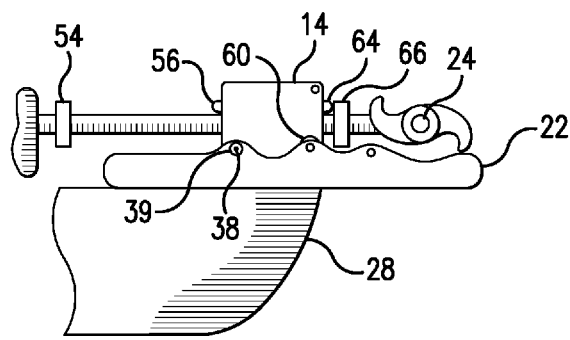
FIGS. 3-6 illustrate four configurations (positioning) of the trolling motor assembly actuated remotely by voice commands, where

Initially, as shown in FIG. 3, the trolling motor assembly is assumed to be in the "store/lock" position. In this initial position, the power can be OFF for the positioning and operation control unit 14 and the wireless transmitting command unit 12.

Figure 7:
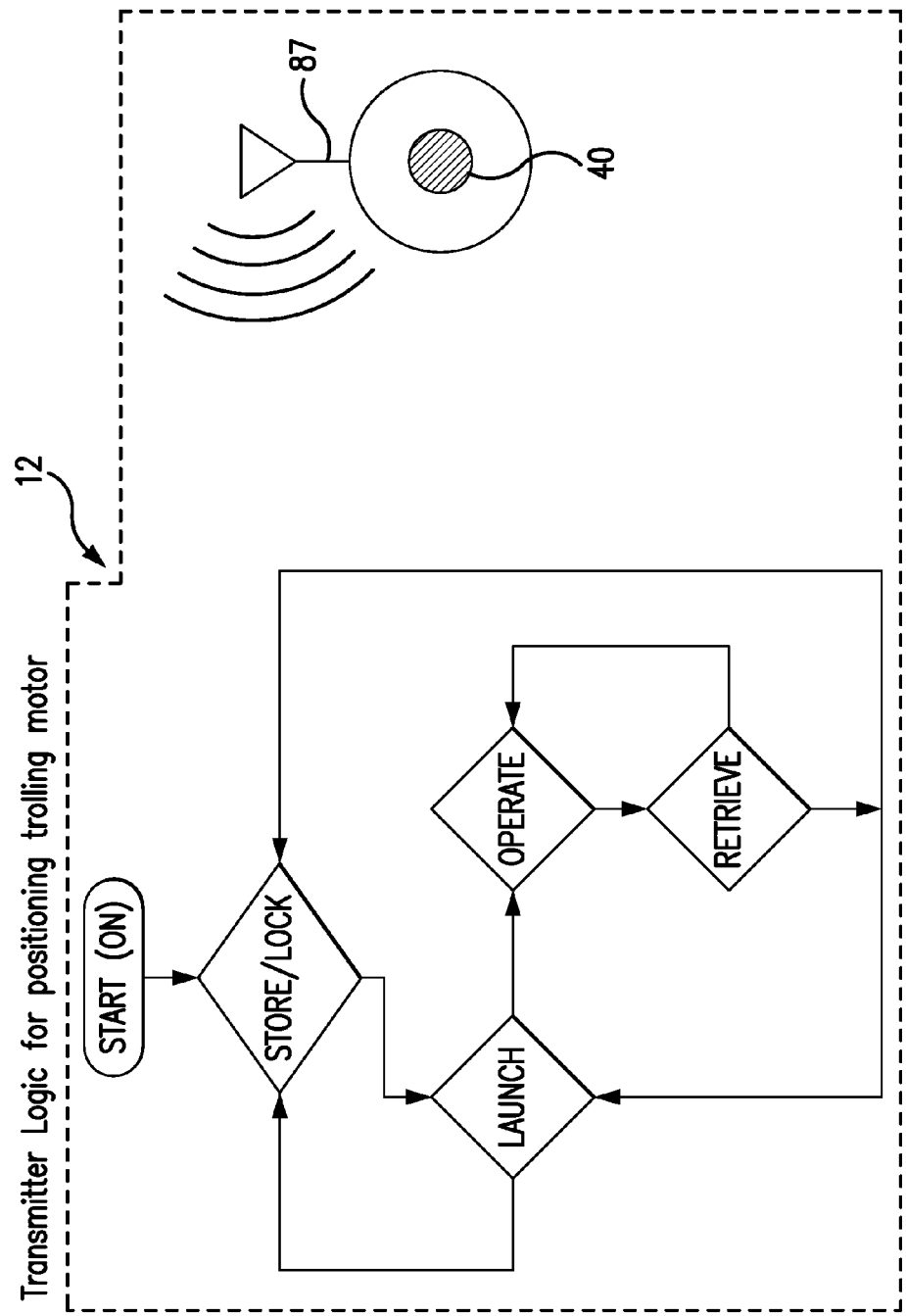
FIG. 7 is a schematic diagram of the subject wireless command transmitter unit and the embedded logic supporting the positioning command sequences.

As shown in FIG. 7, the transmitter logic supporting the automated positioning of the trolling motor is represented by logic blocks "STORE/LOCK", "LAUNCH", "OPERATE", and "RETRIEVE" executed in a specified sequence under the user's voice control. The "LAUNCH" routine is executed after the "STORE/LOCK" routine and prior to the "OPERATE" routine. After the "OPERATE" mode, a "RETRIEVE" routine is executed. Subsequent to the "RETRIEVE" routine, the "LAUNCH", or "STORE/LOCK" modes, or "OPERATE" logic routine can be executed, as commanded by the user. Also, the "LAUNCH" routine can be followed by the "STORE/LOCK" configuration.

Figure 9:
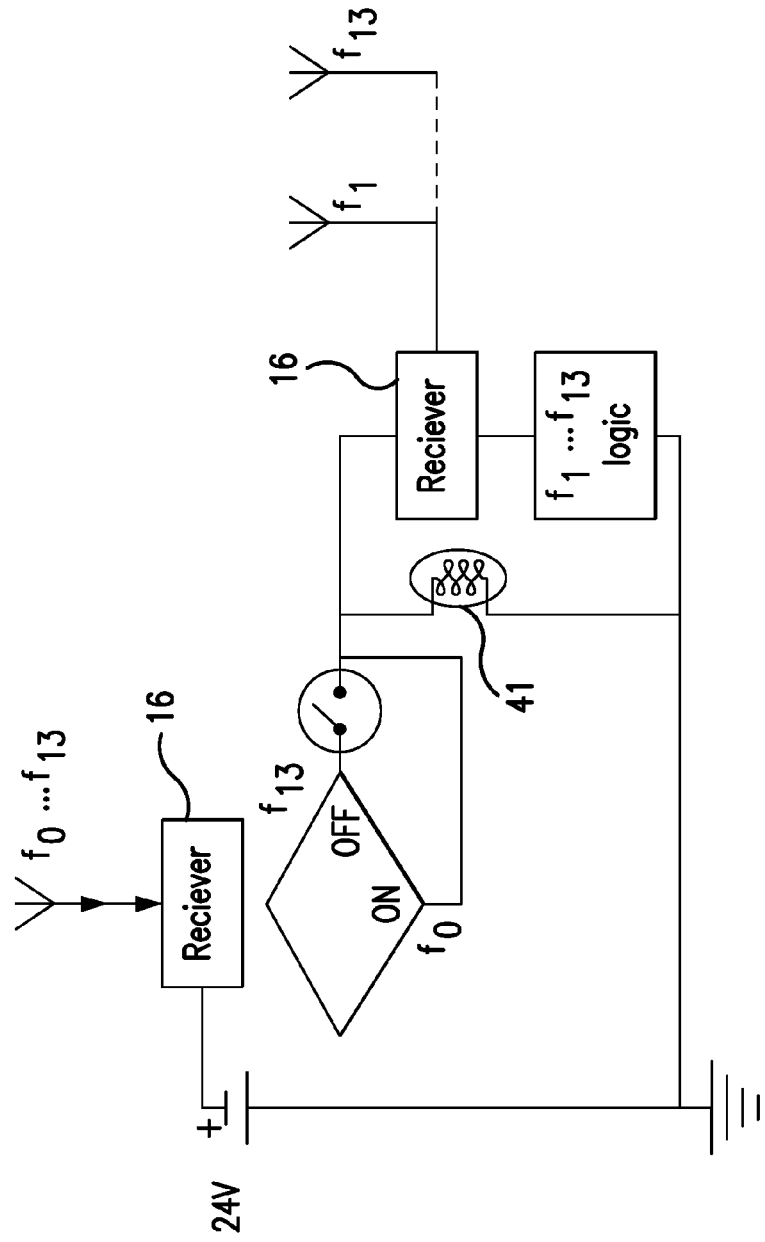
FIG. 9 is representative of the electrical scheme/logic supporting the operation of the subject positioning and operation control unit.
Figure 10:
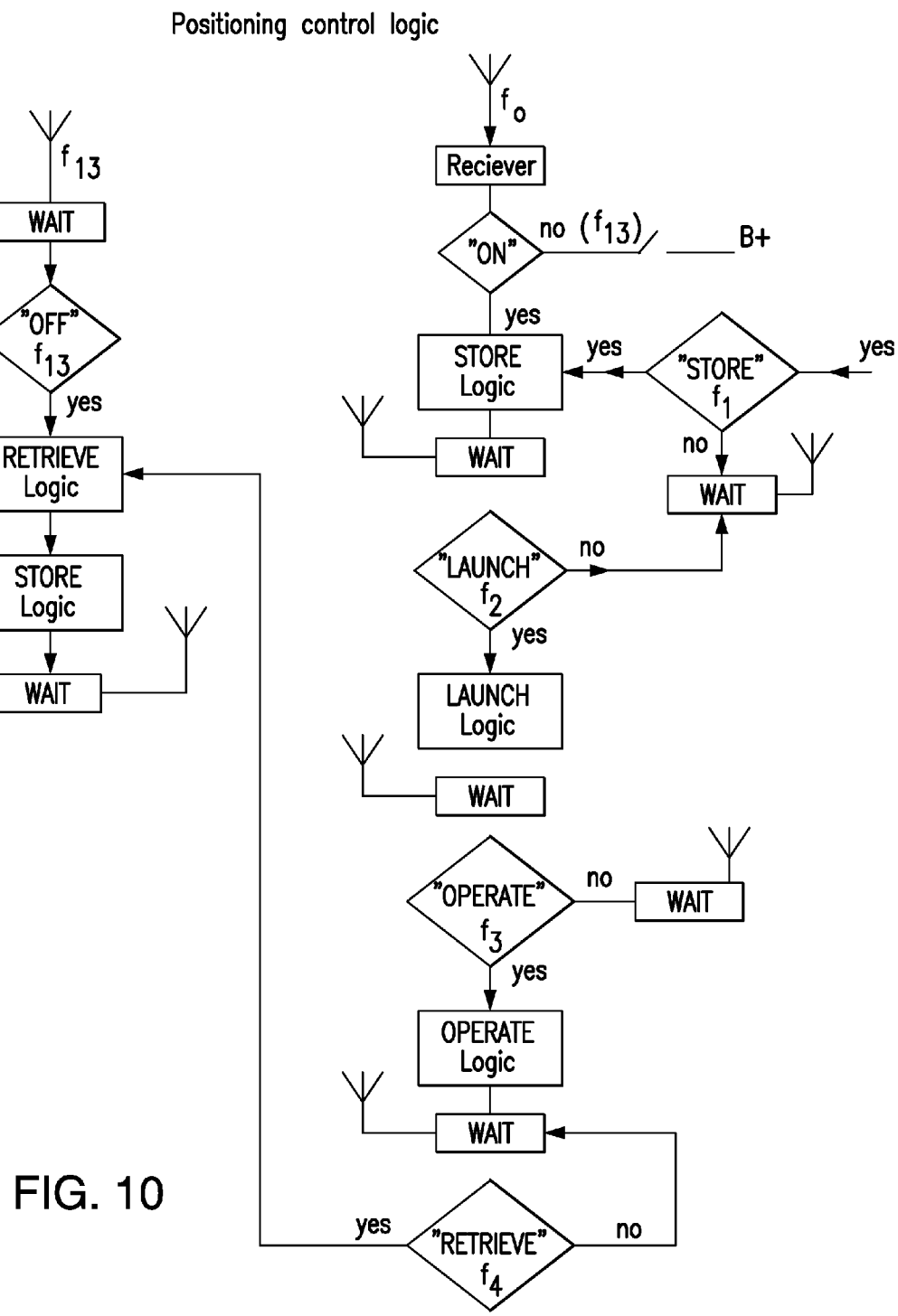
FIG. 10 is a flow chart diagram depicting the positioning control logic supporting the functionality of the positioning and operation control unit for executing the positioning voice commands, and for processing the OFF command.

If, for instance, the user enters the voice (word) command START or ON into the microphone 40 on the wireless command transmitter unit (also referred to herein intermittently as a transmitter) 12 shown in FIG. 7, the receiver 16 in the positioning and operation control unit (also referred to herein intermittently as a control unit) 14, processes the command signal $f_0$ which corresponds to the voice command ON, and switches the power ON for the control unit 14, as shown in FIGS. 9-10, and turns ON the receiver indicator light 41. Subsequently to turning the power ON, the position and operation control unit 14 waits for the next command, as shown in FIG. 10.

The logic supporting the functionality of the positioning and operation control unit 14 is configured to provide the control of fully automatic positioning (configuration) of the trolling motor assembly for a desired mode of operation and the control of the operational parameter of the trolling motor of the propeller assembly 24, when in the operational (active) mode.

The drive mechanism 18 in the positioning and operation control unit 14 is operatively coupled to the receiver 16 for acquiring therefrom the processed command signals to automatically execute the desired action required by the entered voice command. The drive mechanism 18 in this description is based on the logic, mechanical, and electrical components of the subject system 10 which co-operatively support the operation of the positioning and operation control unit 14 to process command signals $f_1, f_2, f_3, f_4, \ldots, f_n$ (corresponding to the operator placed voice commands) and to control positioning, modes of operation and operational parameters of the trolling motor, as is depicted in FIGS. 2A-2C, 9-15, and 16A-16B, as will be detailed in further paragraphs.

As shown in FIG. 8, the transmitter 12 operates as prescribed by the logic to convert the voice command placed by the user into a command signal. If the operator of the boat enters a word STORE using the handheld (or stationary) wireless transmitter command unit 12, the logic embedded in the transmitter 12 generates and transmits the command $f_1$ corresponding to the voice command STORE, which is received and processed at the control unit 14, as shown in FIG. 10.

Figure 11:
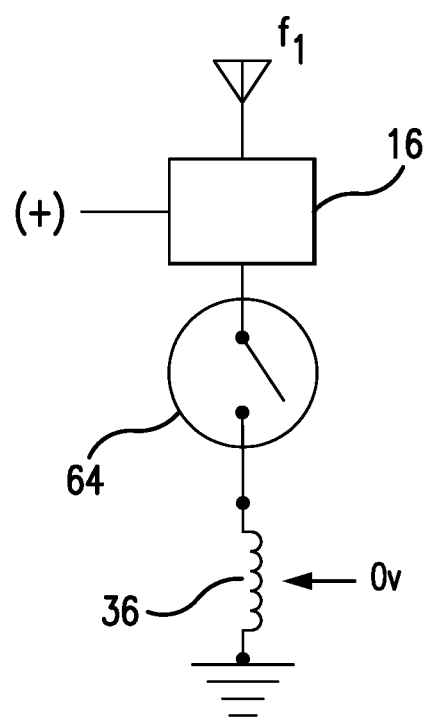
FIG. 11 is a schematic representation of electrical circuitry for implementing the STORE (and LOCK) commands by the subject positioning and operation control unit.

As shown in FIG. 2A the positioning and operation control unit 14 includes a locking mechanism which includes a locking solenoid 36 and a solenoid pin 38. When the receiver 16 in the positioning and operation control unit 14 receives the command signal $f_1$, as shown in FIGS. 10 and 11, it turns OFF (though controlling the STORE/LOCK STOP switch 64) the power to the locking solenoid 36 which causes the solenoid pin 38 to transition from the retracted position to the extended position and to enter a hole 39 formed in the bow mounted base 22, as shown in FIGS. 1 and 3.

If the trolling motor operator wishes to launch the trolling motor assembly 20, i.e., to transition the trolling motor assembly 20 towards a vertical position to actuate the propulsion mode of operation with the propeller assembly 24 immersed in the water, he/she enters the audio (voice) command LAUNCH into the microphone 40 provided on transmitter 12 (as shown in FIGS. 1, 7 and 8).

Figure 4:
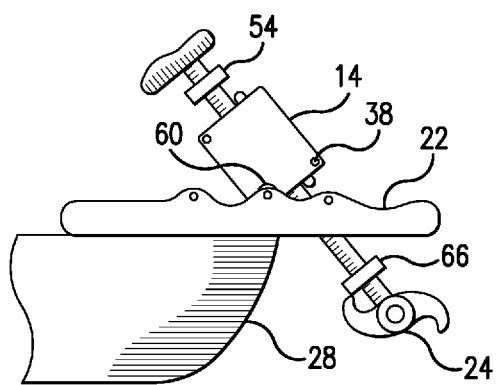

FIG. 4 represents the "LAUNCH" phase of operation when the drive mechanism in the positioning and operation control unit 14 moves the shaft 26 of the trolling motor assembly 20 from its horizontal "STORE/LOCK" (shown in FIG. 3) configuration down to the water. The "LAUNCH" phase of operation is accomplished by the execution of the drive circuit 18 represented in FIGS. 10 and 12, using the electro-mechanical components illustrated in FIGS. 1 and 2A-2C.

When the command signal $f_2$ (corresponding to the voice command LAUNCH) is received and processed at the receiver 16, the drive mechanism 18 of the positioning and operational control unit 14 commands energization of the store/lock solenoid 36, causing the pin 38 to be retracted to attain the launching phase of operation.

Figure 2B:
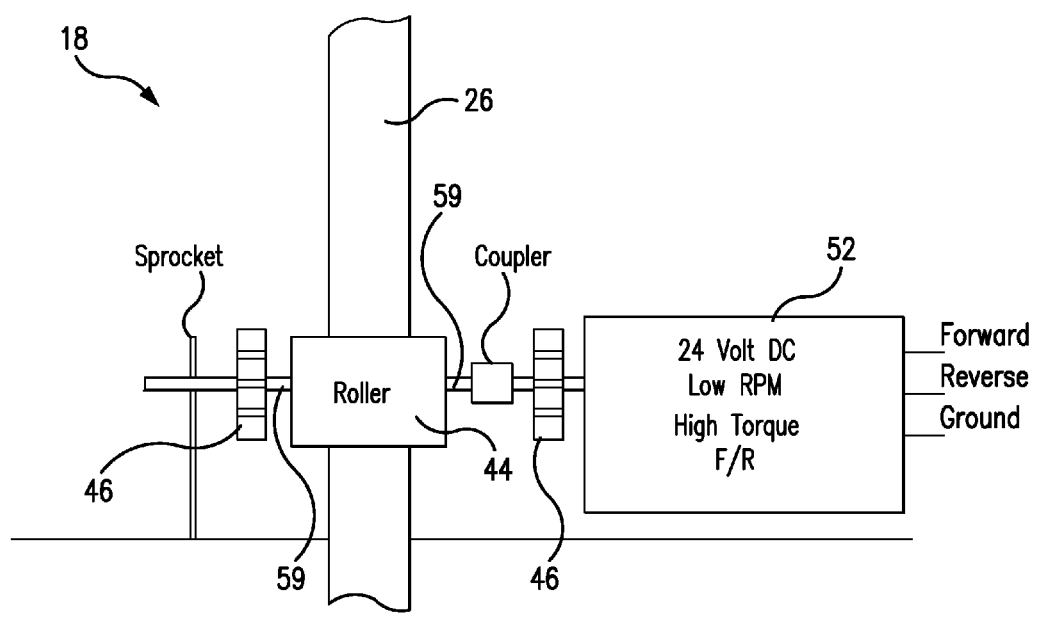
FIG. 2B is a side view of the drive mechanism in the subject positioning and operation control unit for driving the shaft of the trolling motor assembly.
Figure 2C:
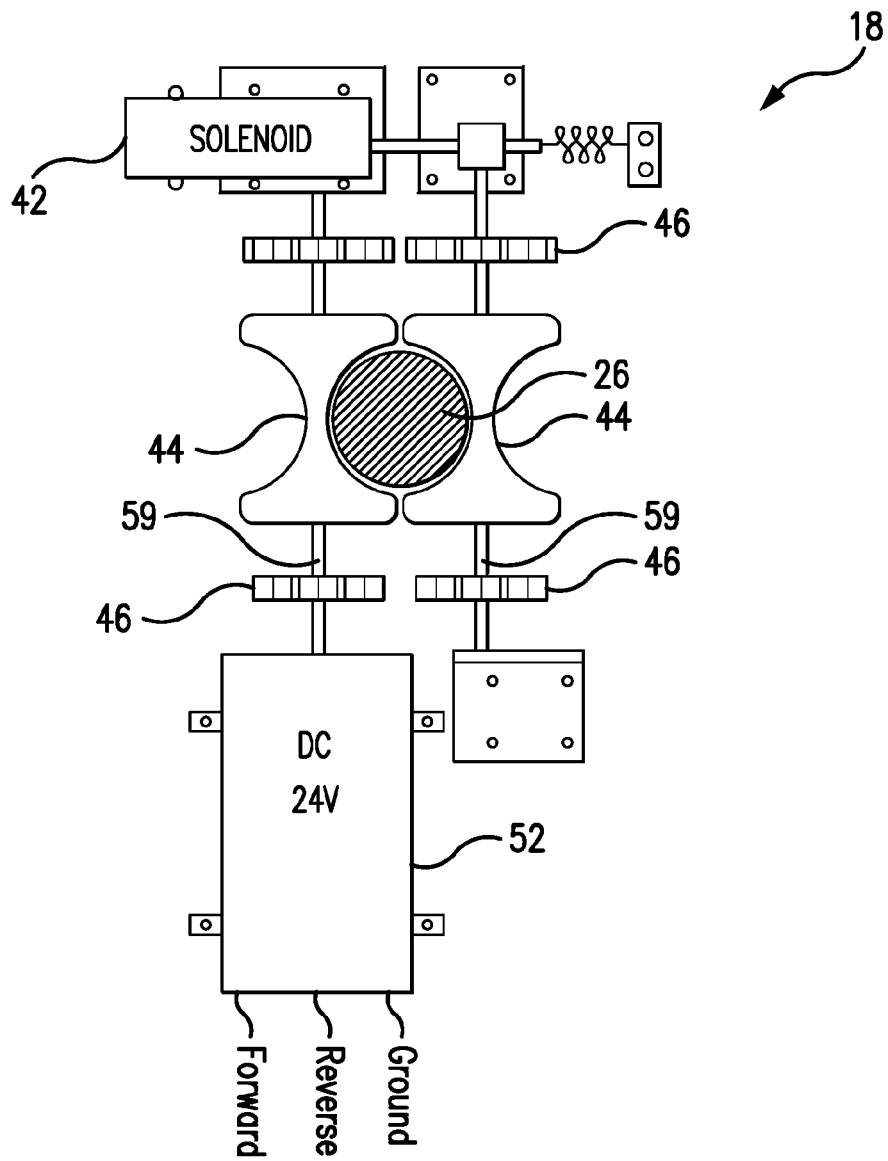
FIG. 2C is a top view of the drive mechanism in the subject positioning and operation control unit for driving the shaft of the trolling motor assembly.
Figure 12:
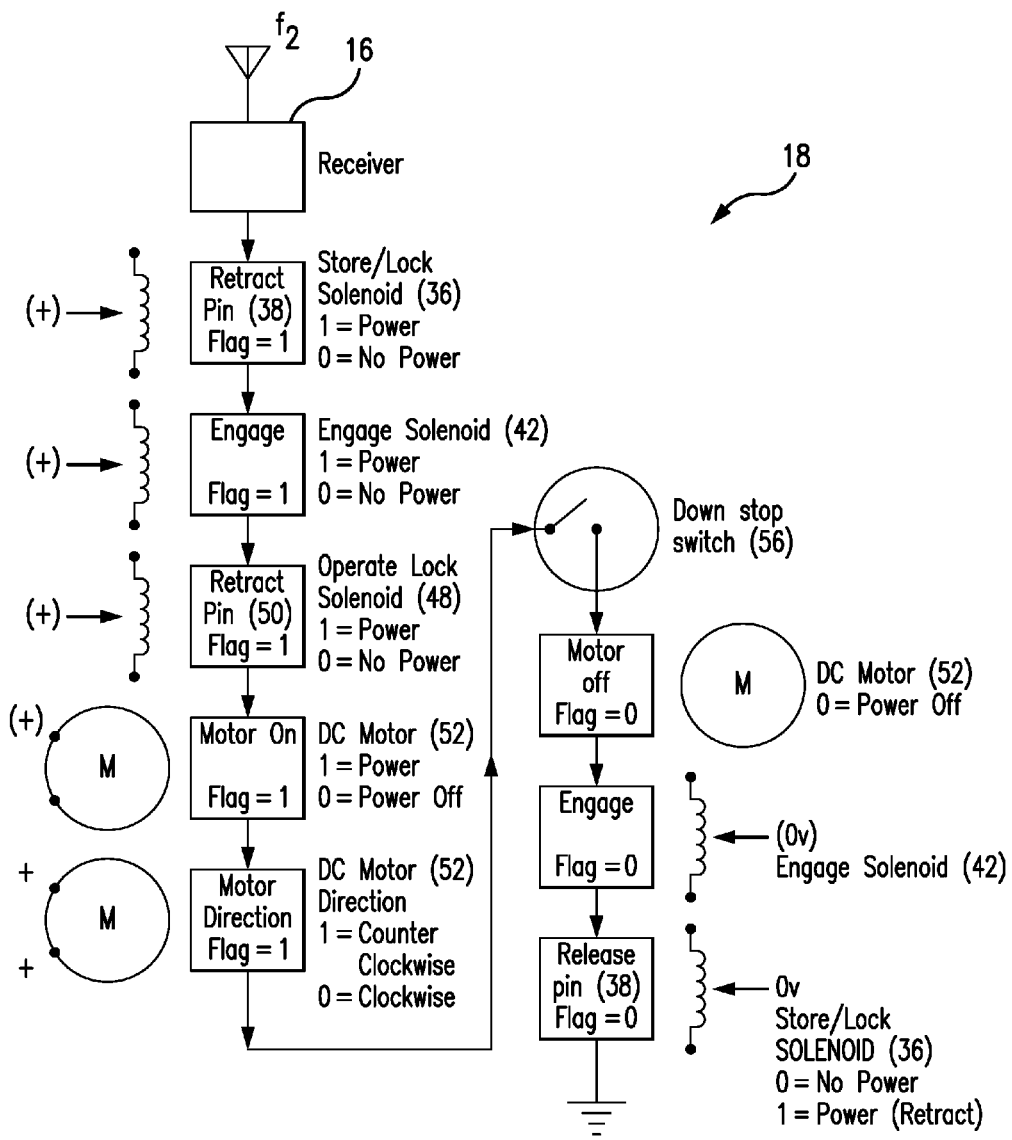
FIG. 12 is representative of the circuit schematic/logic for implementing the LAUNCH command by the subject positioning and operation control unit.

Subsequently, referring to FIGS. 2A-2C, and the schematic depicted in FIG. 12, the engage solenoid 42 is energized. The pin 43 of the engage solenoid 42 (which is connected to the shaft of the elastic, for example, rubber roller 44) draws the elastic (rubber) roller 44 against the trolling motor shaft 26, and engages the drive gears 46 on each roller shaft. Using friction, the positioning and operation control unit 14 thus becomes linked to the shaft 26 of the trolling motor assembly 20.

Sequentially, the trolling motor operation lock solenoid 48 is energized so that its pin/shaft 50 is retracted. Subsequently, as illustrated in FIG. 12, the DC motor 52 is energized and operates in the counter clockwise direction driving the shaft 26 of the trolling motor assembly 20 down until the shaft 26 (which is equipped with the operation stop collar 54) engages the stop button 56 (shown in FIG. 2A).

Subsequently to engaging the stop button 56, the DC motor 52 is turned off, and the engage solenoid 42 is de-energized, thus causing the separation of rubber rollers 44 by the action of the retraction spring 58 (shown in FIG. 2A), resulting in ceasing of the driving force friction due to disengagement of the drive gears 46 on the shafts 59 (shown in FIGS. 2B-2C) of the rubber rollers 44.

At this point, the shaft 26 of the trolling motor assembly 20 has been extended and pivots under its own weight to the vertical position. While the shaft 26 transitions to the vertical position, the return spring 60 (shown in FIG. 2A) is wound.

As an alternative to the return spring 60, an optional retraction motor 62 may be provided, as shown in FIG. 2A, to replace the spring 60 in case of an inadequate spring force.

If the operator of the trolling motor chooses to operate the trolling motor assembly 20 in a fixed position, as illustrated in FIG. 5, he/she enters a voice command OPERATE into the microphone 40 on the wireless command transmitter unit 12. The wireless command transmitter unit 12 generates and transmits a command signal $f_3$ corresponding to the audio command OPERATE. The positioning and operation control unit 14 receives the command $f_3$ and initiates the processing.

Figure 13:
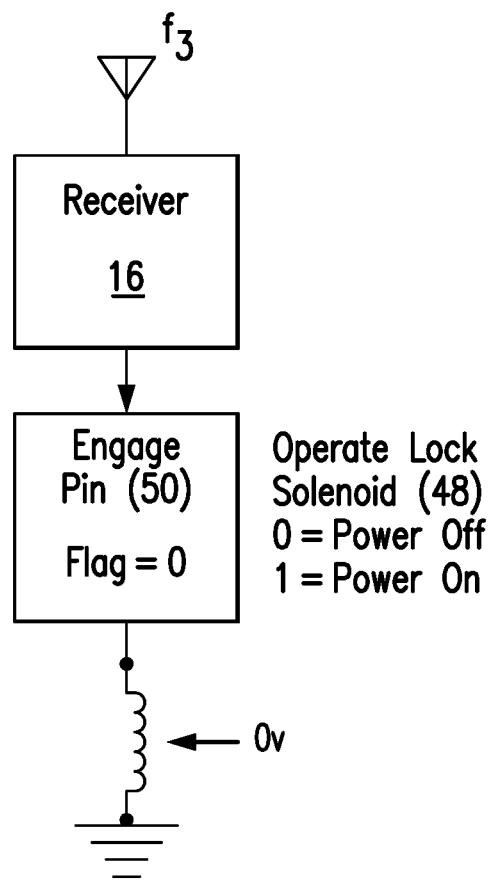
FIG. 13 is a schematic representation of the circuit schematic/logic for implementing the OPERATE command by the subject positioning and operation control unit.

The schematic depicted in FIGS. 10 and 13 represents the execution sequence of processing the command signal $f_3$. After receipt of the command signal $f_3$ at the receiver 16, the locking mechanism is executed by turning OFF the power to the trolling operation lock solenoid 48, thereby prompting the solenoid pin 50 to enter a hole 51 (shown in FIG. 3) formed in the base 22, thus locking the trolling motor assembly 20 in a stable vertical position, shown in FIG. 5.

Figure 6:
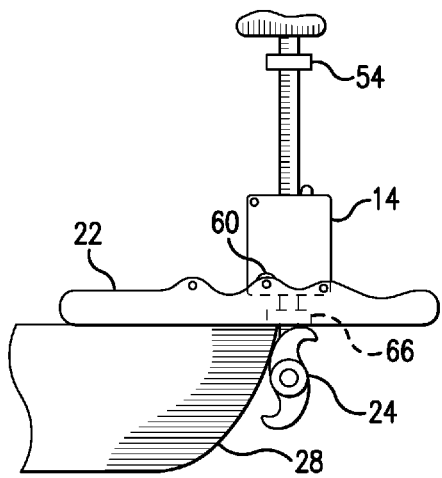
Figure 14:
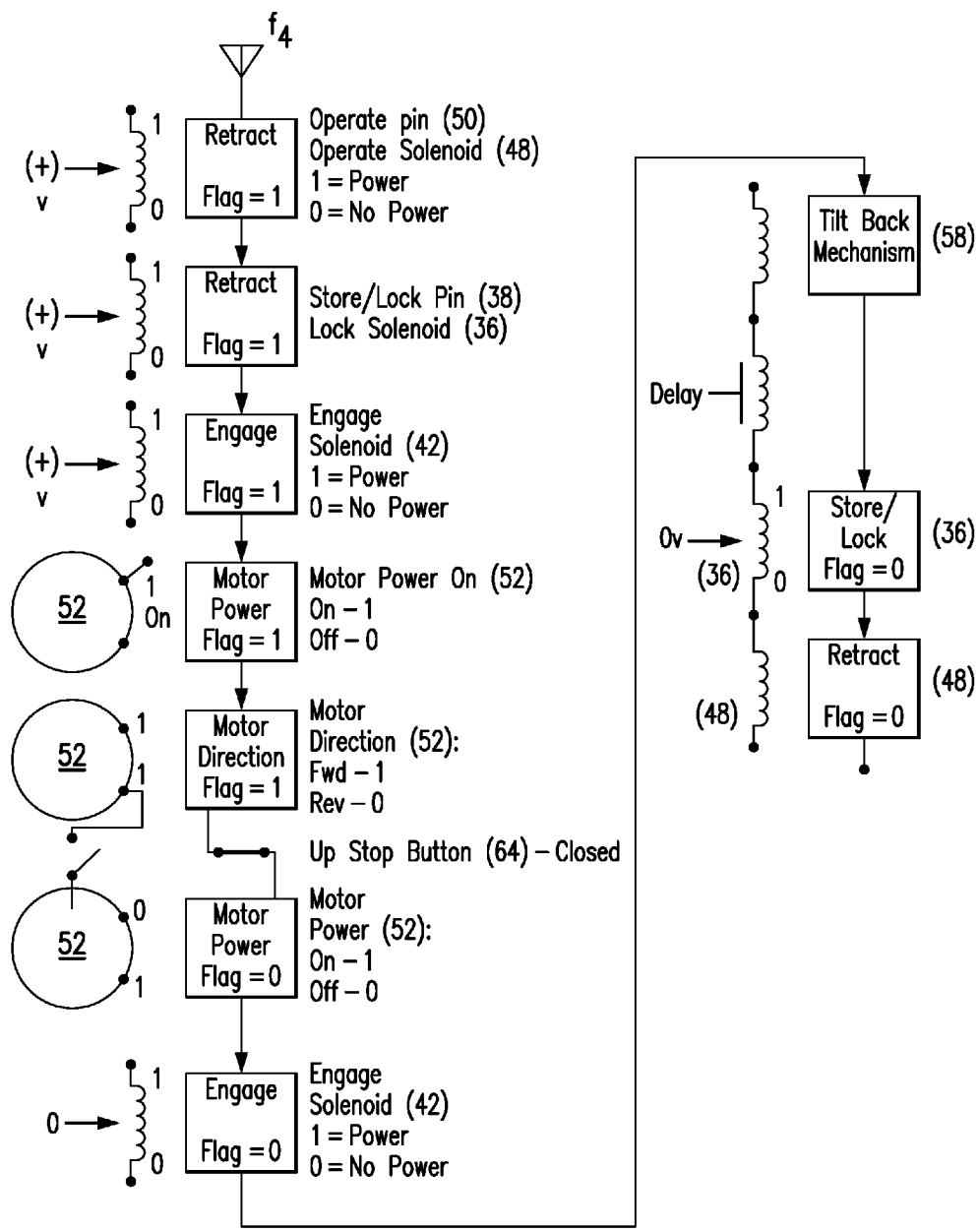
FIG. 14 is representative of the circuit schematic/logic for implementing the RETRIEVE command by the subject positioning and operation control unit.

If the operator elects to retrieve the trolling motor assembly 20 from the vertical operative position shown in FIG. 5 to the horizontal position, he/she places a voice command RETRIEVE into the microphone 40 in the transmitter 12. The initial configuration actuated by the positioning and operation control unit 14 in the RETRIEVE phase of operation is illustrated in FIG. 6. The schematic of the drive mechanism 18 configured to achieve the "RETRIEVE" mode of operation is shown in FIGS. 2A, 10 and 14.

In the "RETRIEVE" mode of operation, upon the voice command RETRIEVE is entered in the microphone 40 of the transmitter 12, the transmitter 12 processes the audio command and generates a corresponding command signal $f_4$, which is transmitted to the receiver 16 in the control unit 14. The locking mechanism is then executed by setting a flag to retract the operation lock solenoid pin 50 in the operation lock solenoid 48. Logic also sets a flag for drive mechanism 18 to retract the store/lock pin 38 of the store and lock solenoid assembly 36.

A flag is set to turn "ON" the DC motor 52, and the engage solenoid assembly 42 is energized to draw the rubber rollers 44 in contact with the shaft 26 of the trolling motor assembly 20 and to engage the drive gears 46.

With the flag set to turn "ON" the DC motor 52 and a flag set for clockwise rotation, the DC motor 52 draws the trolling motor shaft 26 up until the "store" stop collar 66 (shown in FIGS. 1, and 3-6) on the trolling motor shaft 26 hits the store/lock stop button 64 on the housing 65 of the positioning and operation control unit 14. With the button 64 depressed, the power to the operation lock solenoid 48 is turned "OFF" so that the pin 50 stays retracted and the DC motor 52 is turned "OFF".

The drive mechanism 18 also includes a tilt mechanism which transitions the trolling motor assembly 20 to the horizontal position. The tilt mechanism uses the pivot return spring 60 (shown in FIGS. 2A and 3-6), or the drive motor 62 (shown in FIG. 2A) actuated when the command signal $f_4$ (corresponding to the RETRIEVE voice command) is received at the receiver 16 and executed by the drive mechanism 18 as shown in FIG. 10. In this mode of operation, as shown in FIG. 14, a flag is set and the drive mechanism's logic prompts the locking mechanism by commanding to cut OFF the power from the store/lock solenoid 36 in order to extend the store/lock assembly pin 38 into the hole 39 at the base 22.

If the trolling motor assembly 20 has been launched and locked in the vertical operating position shown in FIG. 5, and the operator of the boat wishes to steer the propulsion motor (propeller) 24, he/she issues a voice command such as PORT or STARBOARD entered into the microphone 40 of the command transmitter unit 12.

Subsequent to the entrance of the audio command into the transmitter 12, the transmitter unit 12 processes the audio command and generates a corresponding command signal $f_8$ which is transmitted to the receiver 16 in the positioning and operation control unit 14.

FIG. 8 is representative of the circuitry of the transmitter unit 12 and the sequence of the operations executed by the transmitter unit 12 to convert the voice (word) command input in the microphone 40 into a corresponding command signal for wireless transmission to the receiver 16 in the positioning and operation control unit 14.

As shown in FIG. 8, in order to use the transmitter 12, the operator of the boat has to press the ON/OFF button 70 (also shown in FIGS. 1 and 7) on the transmitter 12 which actuates the transmitter's indicator light 72 (also shown in FIG. 1) and initiates the clock 74. The run time is stored in the memory unit 76 which is supplied to the Audio-to-Digital converter 78 which also receives the audio command entered into the microphone 40.

The digital representation of the audio command is subsequently supplied to the CPU chip 80 which executes (in the block 82) the routine of the digital spectrum analysis for the digital representation of the entered command word. The CPU chip 80 also is configured with the logic to assign (in block 84) a corresponding frequency ($f_0, \ldots, f_n$) to the word command.

The routine performed in block 84 may, for example, use a Look-Up-Table which provides the correspondence between the word commands and command frequencies. An exemplary Look-Up-Table (LUT) 86 depicting the correspondence between the command signals and the voice commands for automatically operating the trolling motor assembly is shown in FIG. 8. However other word commands and corresponding command signals to be transmitted from the transmitter 12 to the receiver 16 are contemplated in the subject system as well.

From block 84, the assigned command frequencies $f_0, \ldots, f_n$ corresponding to the voice commands entered into the transmitter 12 are supplied to the command unit 34 which generates command signals corresponding to the assigned frequencies $f_0, \ldots, f_n$, and transmits the command signals to the receiver 16 using the transmitting antenna 87.

Figure 15:
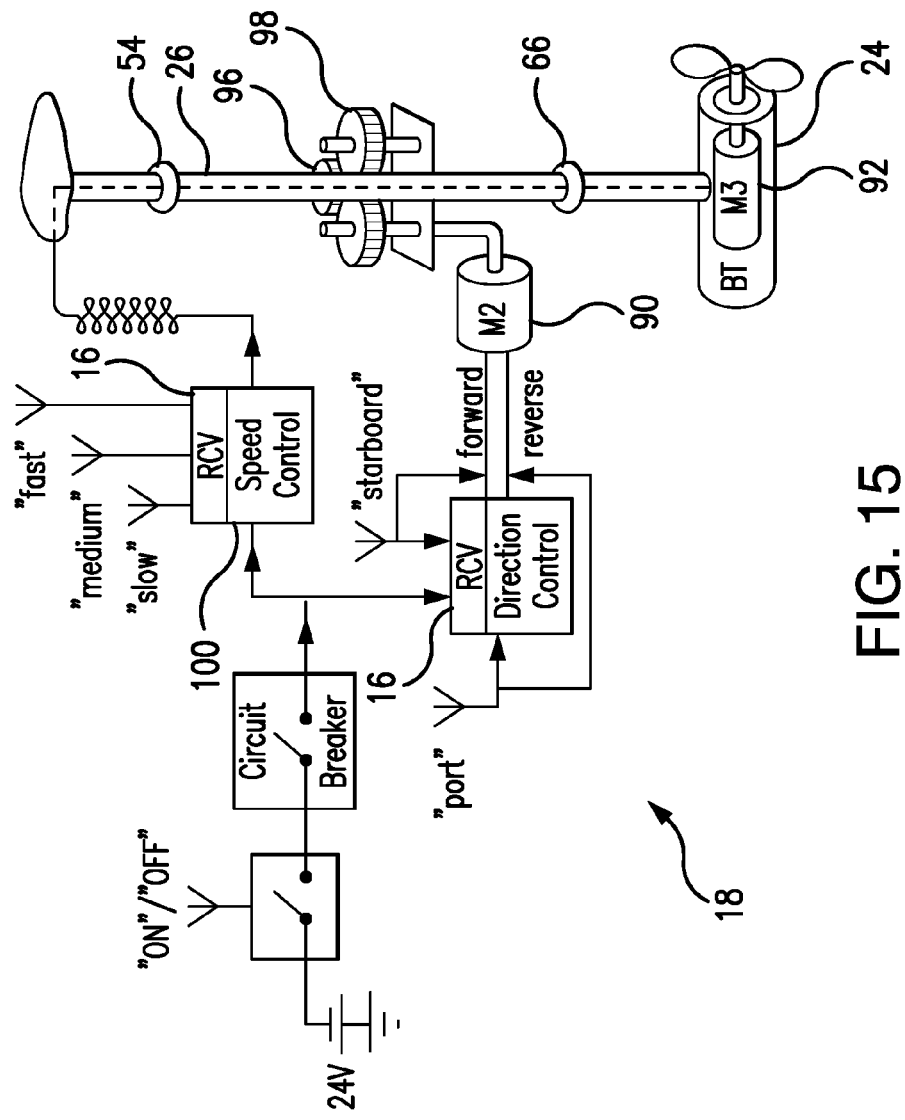
FIG. 15 is a schematic representation of the mechanics/electrical circuit/logic components of the drive mechanism for control of the trolling motor steering and speed implemented in the subject positioning and operation control unit.
Figure 16A:
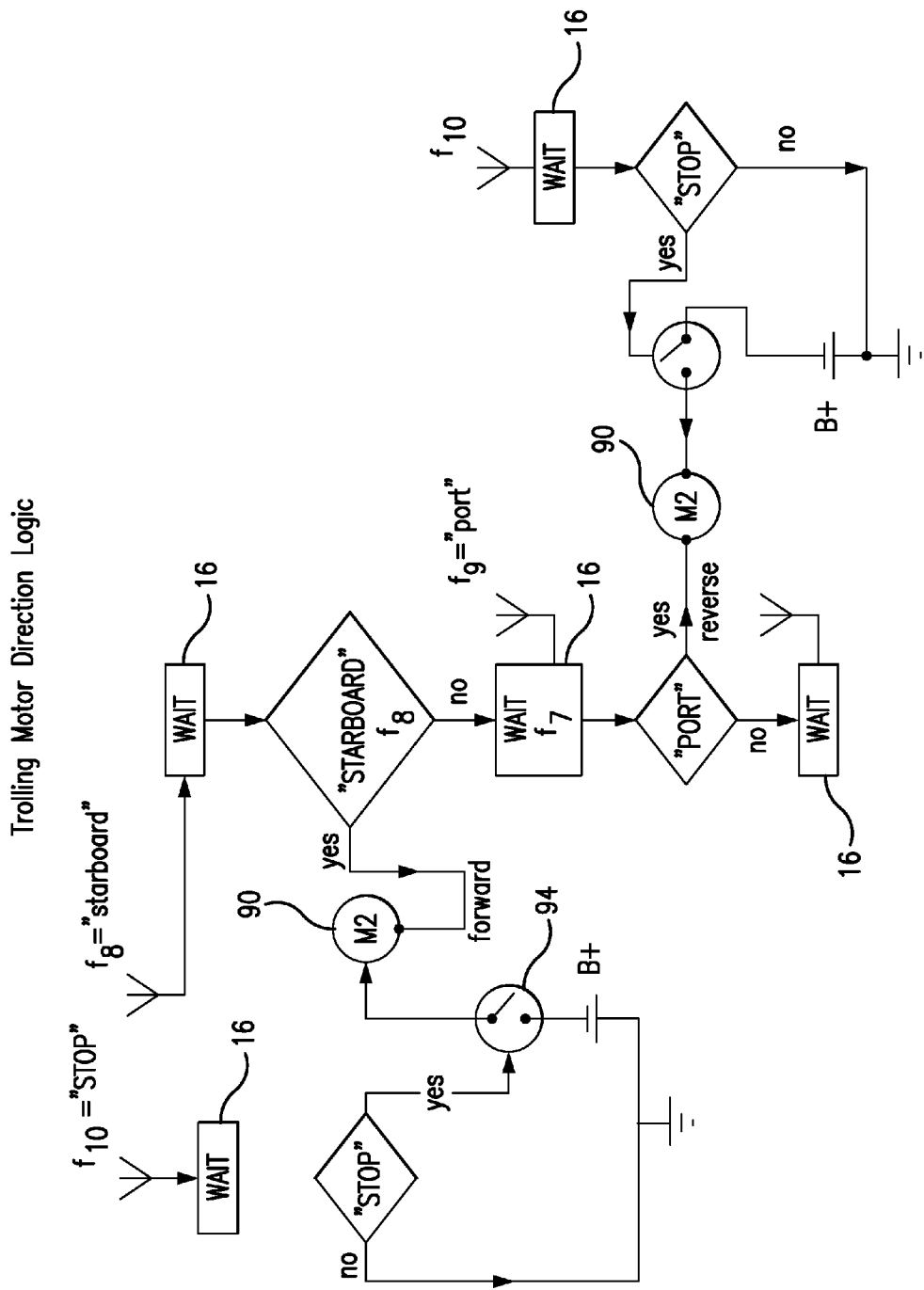
FIG. 16A is a flow chart diagram representative of the direction logic for implementing the STEER command.
Figure 16B:
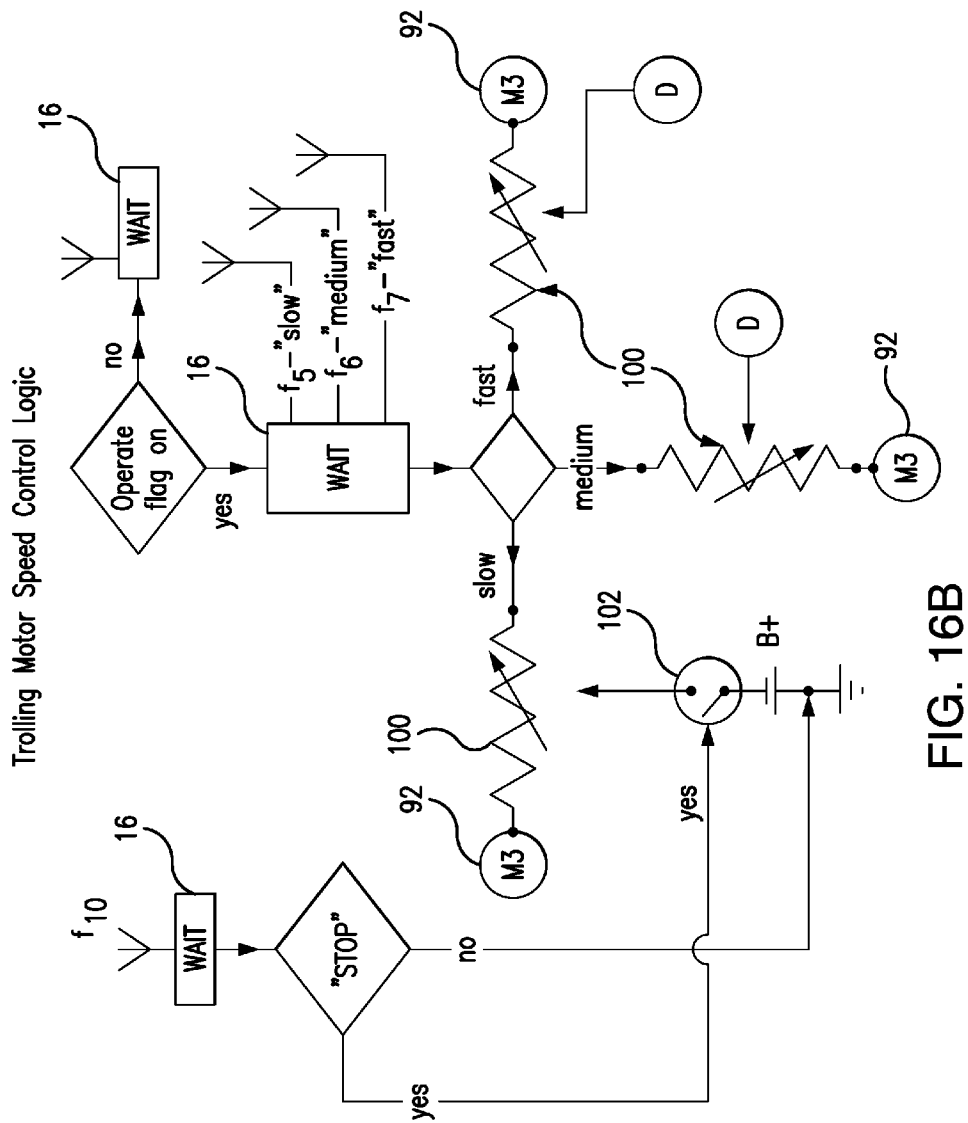
FIG. 16B is a flow chart diagram illustrating the logic flow for controlling the speed of the propulsion motor in the subject system.

FIGS. 15 and 16A-16B illustrate the logic and electro/mechanical components of the drive mechanism 18 executed in the positioning and operation control unit 14 in the STARBOARD or PORT mode of operation shown in FIG. 5.

Referring to FIGS. 15 and 16A, when the receiver 16 receives the command signal $f_8$ corresponding to the voice command STARBOARD entered by the user into the microphone 40 of the command transmitter unit 12, a voltage is applied to a drive motor 90 to rotate the shaft 26 of the trolling motor assembly 20 in the clockwise direction.

Voltage is constantly applied until the operator enters the STOP command (converted into the command signal $f_{10}$) to end the rotation of the shaft 26 to control the direction of rotation of the trolling motor 92, which is also referred to herein as a propulsion motor since it generates the propulsion force when powered. The STOP voice command also cuts OFF the power for the turning motor 90 with the control switch 94 (shown in FIG. 16A).

Optionally, for the trolling motor direction control, the operator may issue the voice command PORT which is converted into the command signal $f_9$ by the logic in the command transmitter 12. The command signal $f_9$ is wirelessly transmitted from the command transmitter 12 to the receiver 16.

Responsive to the receipt of the command signal $f_9$ at the receiver 16, the drive mechanism 18 in the positioning and operation control unit 14 activates the motor 90 to reverse the previous direction (counter-clockwise) so that the rollers 96, 98 (shown in FIG. 15) turn the trolling motor shaft 26 to the port, i.e., for example, to the left.

In order to maintain the continuous turning to the port direction, the operator would issue the voice command STOP which is converted into the signal command $f_{10}$ in the transmitter unit 12 and is transmitted wirelessly to the receiver 16.

Whenever a voice command is executed by the operator, the receiver 16 returns to a wait state for receipt of another command (as shown in FIG. 10).

As shown in FIGS. 15 and 16B, in order to activate propulsion, i.e., to turn ON the trolling motor 92 of the propeller assembly 24, the operator enters in the microphone 40 of the transmitter unit 12 a voice command SLOW, or MEDIUM, or FAST. The transmitter 12 analyzes the voice command and converts it into a corresponding command signal $f_5$, $f_6$, or $f_7$, respectively. Each of these commands induces a different voltage supplied to the motor 92 using a voltage regulator 100.

The operator can maintain the rotation of the propeller with the voice command STOP (corresponding to the signal command $f_{10}$) which disconnects voltage with the switch 102.

Should the operator wish to cease the usage of the trolling motor assembly 20, he/she would use the voice command OFF which is analyzed and processed in the command transmitter 12, and a corresponding command signal $f_{13}$ is generated and wirelessly transmitted to the receiver 16 to de-actuate the drive mechanism 18 as shown in FIGS. 9 and 10. The receiver's indicator light 41 is turned OFF as well. The logic and electro-mechanical components of the drive mechanism 18 in the positioning and operation control unit 14 automatically return the trolling motor assembly 20 to the stored (and locked) horizontal position on the bow of the boat as shown in FIG. 3.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A wireless control system for trolling motor, comprising:
    a base unit adapted to be mounted to the deck of a boat,
    a positioning control and operation unit pivotally attached to said base unit, said positioning and operation control unit including a wireless receiver and a drive mechanism operatively coupled to said receiver,
    a trolling motor assembly including a shaft and a trolling motor attached at one end of said shaft, wherein said shaft is attached to said positioning and operation control unit, and
    a voice activated command transmitter unit controlled by a user, said transmitter unit being configured, when being voice activated by the user, to generate at least one command signal corresponding to at least one voice command entered by the user thereto, and to wirelessly transmit said at least one command signal to said receiver in said positioning and operation control unit,
    wherein said positioning and operation control unit is configured to automatically positioning said trolling motor assembly in at least one mode of operation identified by the user through said at least one voice command entered by the user into the command transmitter unit, wherein said voice activated command transmitter unit further includes a microphone for entering said at least one voice command,
    an audio-to-digital converter coupled to said microphone for converting said at least one voice command into a digital representation thereof,
    a CPU chip coupled to said audio-to-digital converter, wherein said CPU chip includes a Digital Spectrum Analysis unit configured for analysis of said digital representation of said at least one voice command received thereat from said audio-to-digital converter, and
    a word-to-frequency assignment unit configured to assign a corresponding frequency signal to a predetermined word representative of said at least one voice command entered by the user, and
    a command signal generating unit coupled to said word-to-frequency assignment unit and configured to generate and wirelessly transmit said at least one command signal based on said assigned frequency signal.

2. The wireless control system for bow mounted electric trolling motor of claim 1,
    wherein said at least mode of operation corresponds to a positioning of said trolling motor assembly selected from a group including an operational position, a non-operational position, and at least one intermediate position,
    wherein in said operational position, said shaft of said trolling motor assembly is disposed substantially vertically with respect to said base unit with said trolling motor immersed in water,
    wherein in said non-operational position, said shaft of said trolling motor assembly is disposed substantially horizontally with respect to said base unit and secured thereto with said trolling motor removed from water, and
    wherein in one of said intermediate positions, said shaft is disposed substantially vertically with respect to said base unit with said trolling motor removed from water.

3. The wireless control system for trolling motor of claim 2, wherein said drive mechanism of said positioning and operation control unit further includes a locking mechanism for locking said trolling motor assembly to said base unit in at least one of said operational, non-operational and at least one intermediate positions, said locking mechanism being operatively coupled to and being actuated by said drive mechanism in accordance with said at least one command signal received at said receiver.

4. The wireless control system for trolling motor of claim 3, wherein, when said trolling motor assembly is in said non-operational horizontal position, said wireless command transmitter unit generates and wirelessly transmits to said positioning and operational control unit an actuation command signal resulting in power ON of said positioning and operational control unit.

5. The wireless control system for trolling motor of claim 4, wherein, subsequent to said actuating command signal, said wireless command transmitter unit generates and transmits a locking command signal to said locking mechanism in said positioning and operation control unit resulting in actuation of said locking mechanism for locking said trolling motor unit to said base unit in said non-operational substantially horizontal position.

6. The wireless control system for trolling motor of claim 3, wherein, subsequently to entering a LAUNCH voice command into said microphone by the user, said wireless command transmitter unit generates and wirelessly transmits a launching command signal to said positioning and operation control unit, resulting in de-actuation, by said drive mechanism, of said locking mechanism and releasing said trolling motor assembly from being locked at said base unit in said non-operational substantially horizontal position.

7. The wireless control system for trolling motor of claim 6, wherein said launching command signal further actuates pivotal displacement of said trolling motor assembly from said non-operational substantially horizontal position to said operational substantially vertical position.

8. The wireless control system for trolling motor of claim 3, wherein, subsequently to entering a LOCK voice command into said microphone by the user, said wireless command transmitter unit generates and transmits a locking command signal to said positioning and operation control unit resulting in actuation of said locking mechanism by said drive mechanism, and in locking of said trolling motor assembly to said base unit in said operational position.

9. The wireless control system for trolling motor of claim 3, wherein, subsequently to entering a RETRIEVE voice command in said microphone by the user, said wireless command transmitter generates and transmits a retrieving command signal to said positioning and operation control unit, resulting in de-actuation of said locking mechanism to release said trolling motor assembly from being locked to said base unit in said vertical position thereof, followed by the vertical retraction of said shaft of said trolling motor assembly and removal of said propulsion motor from water, and in subsequent pivotal displacement of said trolling motor assembly from said non-operational vertical position to said non-operational position.

10. The wireless control system for trolling motor of claim 3, wherein said wireless command transmitter unit includes a Lock-Up-Table containing a plurality of command words corresponding to predetermined voice commands and a plurality of command frequencies, each corresponding to a respective command word for the plurality thereof, said plurality of command words selected from the group including ON, OFF, STORE, LAUNCH, RETRIEVE, OPERATE, STOP, SLOW, MEDIUM, FAST, STARBOARD, PORT, STEER, and SPEED command words,
wherein, subsequent to entering the STORE command word in the microphone by the user, said wireless command transmitter unit generates and wirelessly transmits a locking command signal to said receiver,
wherein, subsequent to entering the LAUNCH command word in the microphone by the user, said wireless command transmitter unit generates and wirelessly transmits a launching command signal to said receiver,
wherein, subsequent to entering the OPERATE command word in the microphone by the user, said wireless command transmitter unit generates and wirelessly transmits an operating command signal to said receiver, and
wherein, subsequent to entering the RETRIEVE command word in the microphone by the user, said wireless command transmitter it generates and wirelessly transmits a retrieve command signal to said receiver.

11. The wireless control system for trolling motor of claim 1, wherein said receiver in said positioning and operation control unit includes a receiving antenna to receive said command signals, and wherein said wireless command transmitter unit includes a transmitting antenna to wirelessly transmit said command signals to said receiving antenna in said positioning and operation control unit.

12. The wireless control system for trolling motor of claim 3, wherein said drive mechanism is configured to process said at least one of said command signals received from said wireless command transmitter unit and to actuate/de-actuate said locking mechanism in accordance with said at least one command signal.

13. The wireless control system for trolling motor of claim 10, wherein said locking mechanism is actuated by said drive mechanism in accordance with said at least one command signal received at said receiver, said locking mechanism including:
a locking solenoid operatively coupled to said receiver, and a solenoid pin coupled to said locking solenoid and configured for displacement between an extended position and a retracted position, and
an operation lock solenoid operatively coupled to said receiver and an operation lock pin coupled to said operation lock solenoid and configured for displacement between an extended position and a retracted position thereof,
wherein, upon receipt of the STORE command signal at said receiver, said drive mechanism operates to actuate said locking solenoid to displace said solenoid pin in said extended position, and engage said solenoid pin in an opening formed in said base unit, and
wherein upon receipt of said LAUNCH command signal at said receiver, said drive mechanism operates to actuate said locking solenoid to displace said solenoid pin into said retracted position.

14. The wireless control system for trolling motor of claim 8, wherein said locking mechanism further includes:
an elastic rubber roller operatively coupled to said shaft of said trolling motor assembly,
a DC motor coupled to a pivot shaft of said positioning and operation control unit, and
an engage solenoid unit operatively coupled to said elastic roller,
wherein, upon receipt of said launching command signal, said drive mechanism actuates said engage solenoid to bring said elastic roller in gripping engagement with said shaft of the trolling motor assembly, actuates said operation lock solenoid to displace said operation lock pin in said retracted position, and actuates said DC motor to rotate said positioning and operation control unit about said pivot shaft, thereby rotating said shaft of said trolling motor assembly towards said operational substantially vertical position thereof.

15. The wireless control system for trolling motor of claim 14, wherein upon the receipt of the launching command signal at said receiver, the drive mechanism launches said trolling motor assembly from the horizontal store position to the vertical position with high torque low speed motor to drive said rubber rollers for engagement with said engage solenoid about the shaft of the trolling motor assembly and to transition, by the force of friction, the trolling motor shaft into a substantially horizontal position.

16. The wireless control system for trolling motor of claim 15, wherein, the receipt of said retrieve command signal at said receiver, said drive mechanism retrieves the trolling motor assembly from the vertical operational position by actuating a reversing function of the DC motor connected to said elastic rollers, resulting in pivoting the shaft of the trolling motor assembly at the base unit.

17. A method wireless control of trolling motor assembly, comprising:
attaching a base unit to a deck of a boat;
pivotally attaching a positioning and operation control unit to said base unit, and embedding a wireless receiver and a drive mechanism operatively coupled to said receiver into said positioning and operation control unit;
attaching a trolling motor assembly including a shaft and a trolling motor at one end of said shaft to said positioning and operation control unit;
installing a microphone on a voice activated wireless command transmitter unit, and configuring said voice activated wireless command transmitter unit to generate command signals corresponding to voice commands entered by a user into said microphone through the steps of:
configuring said wireless command transmitter with an audio-to-digital converter coupled to said microphone,
coupling a CPU chip to said audio-to-digital converter,
configuring said CPU chip with a Digital Spectrum Analysis unit,
coupling a word-to-frequency assignment unit to said Digital Spectrum Analysis Unit, and
coupling a command signal generating unit to said word-to-frequency assignment unit;
entering at least one voice command by a user into said microphone;
converting, at said audio-to-digital converter, said at least one voice command into a digital representation thereof,
analyzing, at said Digital spectrum Analysis Unit, said digital representation of said at least one voice command received thereat from said audio-to-digital converter,
assigning, at said word-to frequency assignment unit, a corresponding frequency signal to a predetermined word representative of said at least one voice command entered by the user,
generating, at said command signal generating unit, at least one command signal based on said assigned frequency signal, and
wirelessly transmitting said at least one command signal to said receiver in said positioning and operation control unit; and
automatically positioning, by said positioning and operation control unit, said trolling motor assembly in at least one mode of operation identified by the user through said entered at least one voice command.

18. The method of claim 17, wherein said at least mode of operation corresponds to a positioning of said trolling motor assembly selected from a group including an operational position, a non-operational position, and at least one intermediate position, the method further comprising:
in said operational position, operating said drive mechanism to dispose said shaft of said trolling motor assembly substantially vertically with respect to said base unit with said trolling motor in contact with water;
in said non-operational position, operating said drive mechanism to dispose said shaft of said trolling motor assembly substantially horizontally with respect to said base unit and secured thereto with said trolling motor removed from water;
in said intermediate positions, operating said drive mechanism to dispose said shaft substantially vertically with respect to said base unit with said trolling motor removed from water;
configuring said positioning and operation control unit with a locking mechanism, and operating said drive mechanism to lock said trolling motor assembly to said base unit in at least one of said operational, non-operational and at least one intermediate positions, in accordance with said at least one command signal received at said receiver;
in said non-operational horizontal position, generating and wirelessly transmitting by said wireless command transmitter unit to said positioning and operational control unit an actuation command signal resulting in power ON of said positioning and operational control unit, and
subsequent to said actuating command signal, generating and transmitting a locking command signal by said wireless command transmitter unit to said locking mechanism for locking said trolling motor assembly to said base unit in said non-operational substantially horizontal position;
subsequent to entering a LAUNCH voice command into said microphone by the user, generating and wirelessly transmitting a launching command signal by said wireless command transmitter unit to said positioning and operation control unit, resulting in de-actuation, by said drive mechanism, of said locking mechanism and releasing said trolling motor assembly from being locked at said base unit in said non-operational horizontal position, and
actuating a pivotal displacement of said trolling motor assembly from said non-operational horizontal position to said operational vertical position;
subsequent to entering a LOCK voice command into said microphone by the user, generating and transmitting a locking command signal by said wireless command transmitter unit to said positioning and operation control unit, resulting in actuation of said locking mechanism by said drive mechanism, and in locking of said trolling motor assembly to said base unit in said operational vertical position;
subsequent to entering a RETRIEVE voice command in said microphone by the user, generating and transmitting a retrieving command signal by said wireless command transmitter to said positioning and operation control unit, resulting in de-actuation of said locking mechanism to release said trolling motor assembly form being locked to said base unit in said substantially vertical position thereof, followed by the vertical retraction of said shaft of said trolling motor assembly and removal of said trolling motor from water, and in subsequent pivotal displacement of said trolling motor assembly from said non-operational substantially vertical position to said non-operational substantially horizontal position; and
subsequent to entering the OPERATE command in said microphone by the user, generating and wirelessly transmitting an operating command signal by said wireless command transmitter unit to said receiver, resulting in locking said trolling motor assembly in a stable substantially vertical position with the trolling motor immersed in water.

* * * * *